Nov. 7, 1950 — M. S. CORBETT — 2,529,139

THERAPEUTIC PLASTER

Filed March 18, 1948

Inventor
Mitchell S. Corbett
by The Firm of Charles H. Hill
Attys

Patented Nov. 7, 1950

2,529,139

UNITED STATES PATENT OFFICE 2,529,139

THERAPEUTIC PLASTER

Mitchell S. Corbett, Chicago, Ill.

Application March 18, 1948, Serial No. 15,615

4 Claims. (Cl. 128—89)

The present invention relates to a therapeutic plaster and to methods of making the same. More particularly, this invention relates to therapeutic plasters consisting solely of a plurality of superimposed sheets of plastic film material and to methods making such plasters.

Thermoplastic film, such as that employed in the present invention, has been proposed for use as a backing material for adhesive tape, absorbent bandages and similar products. Also, medicinal plasters of various construction have been made employing one or more sheets of thermoplastic material bonded together to the surface to be treated by means of a suitable adhesive. Such plasters are generally coated or impregnated with a medicinal preparation or the medicinal agent may be confined between the plies of the laminated sheets by means of an adhesive bonding the sheets into an integrated structure. The plasters are applied to the area to be treated, and the actual medicinal treatment of the area is accomplished by means of the therapeutic agent carried by the plaster.

The present invention provides an improved type of therapeutic plaster for the treatment of medicinal disorders such as sciatica, brachial neuralgia, lumbago, laryngitis, arthritis, and muscular pains. The plaster as herein described comprises a plurality of superimposed layers of a non-tacky film or foil of thermoplastic material such as plasticized vinyl chloride, vinyl acetate and copolymers of vinyl chloride and vinyl acetate. The film itself is employed to effect the treatment and it is not necessary to furnish a secondary therapeutic agent as employed in the prior art. Furthermore, no adhesive is employed to bond the layers of film together or to the area undergoing treatment.

As above described, the plaster herein provided consists solely of a plurality of superimposed sheets of thermoplastic material. The film is applied to the member to be treated as a single integrated plaster formed of a plurality of superimposed sheets of a size and configuration to cover the entire area to be treated. If desired, the film may be crumpled, as between the hands, to present a cockled sheet surface prior to its application to the area to be treated for reasons to be hereafter described.

It has been found that thermoplastic film sheets suitable for use as plasters of the present invention, such as cast vinyl acetate-vinyl chloride copolymer films, possess an affinity for each other, and when a sheet of such material is brought into contact with a second sheet of the same composition, the two sheets tend to remain in contact unless forcibly pulled apart. This property of the films is utilized in the present invention to eliminate the need of adhesives heretofore employed in conventional plasters. The film also have a certain affinity for the human skin, although to a lesser degree. This affinity is believed due to the inherent layer of moisture, oil and other substances normally present on the skin. I have found that the affinity of the sheets for one another is sufficient to hold the sheets together as a unitary structure and that the affinity of the sheets for the skin is sufficient to prevent accidental displacement of the plaster from the body in normal use. In use, however, it is preferred that the plaster be applied to the body and then that an article of clothing, such as an undershirt or hospital gown, be worn by the patient over the plaster to prevent accidental displacement of the plaster.

The theory upon which the beneficial healing results obtained by the use of the plaster herein described may be predicated is not clearly understood at the present time. It is known that the plastic sheet material such as that employed is an excellent thermal insulating material. The plurality of superimposed plastic sheets would have a decided thermal insulating value by themselves and, if crumpled sheets are employed, the large number of relatively small air chambers between the cockled surfaces of the sheets may serve as dead air spaces to increase the thermal insulating effect of the plaster. Further, the sheets are in contact at an infinite number of points on each sheet surface, and since the sheets are not bound together except by the affinity between the sheets, they are capable of slight relative movement, especially upon movement of that portion of the body to which the plaster is applied.

Actual clinical tests of the plaster of my invention indicate that the area covered by the plaster becomes warm and perspires freely. This effect tends to show that the plaster actually functions as an insulating material which may be applied directly to the area to be treated. Excellent clinical results have been obtained by the use of the plaster herein provided in the treatment of sciatica, lumbago, brachial neuralgia, laryngitis, arthritis, severe contusions, neuralgia, tight chest colds, and muscular aches and pains.

It is therefore an important object of the present invention to provide a therapeutic plaster which comprises a plurality of superimposed layers of a plastic sheet or foil material.

It is another important object of the present invention to provide a therapeutic plaster which consists solely of a plurality of superimposed sheets of thermoplastic material, the sheets being bonded together to form a unitary plaster by the contactual affinity between the layers, each of said layers being crumpled to present a non-uniform surface, the layers cooperating to define a plurality of relatively small air spaces between the sheets.

Other and further important objects of this invention will become apparent from the following description and appended claims.

Figure 1:
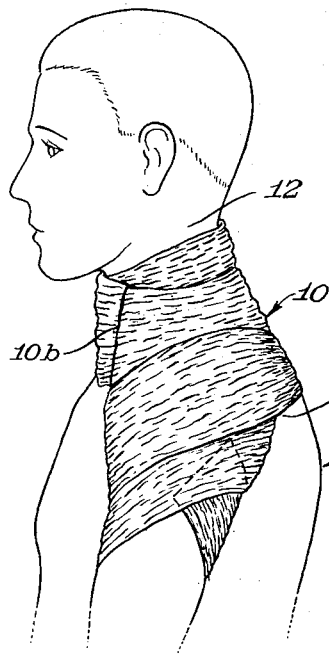
Figure 1 is a side elevational view of a therapeutic plaster of the present invention illustrated as applied to the neck and shoulder of a patient.

In Figure 1, reference numeral 10 refers generally to a plaster of the present invention as applied to the shoulder 11 and neck 12 of a patient 13. As illustrated, the plaster is applied to the skin as an elongated, relatively narrow strip formed of a plurality of superimposed sheets of material. The plaster may be applied to the parts of the body to be treated by merely placing the plaster on the skin, the natural affinity of the sheet material for the skin causing the plaster to remain in position. The free end 10b of the plaster 10 is maintained in position on the remainder of the plaster by the affinity of the plastic material for itself. There is no need of winding the plaster herein provided, even when employed as an elongated strip of superimposed sheets, about the member as a conventional bandage since the plaster itself is formed of a number of layers of sheet material.

The plaster, applied as shown in Figure 1, may be employed for the treatment of torticollis rheumatism of the neck muscles, for laryngitis, or for muscular pain of the shoulder.

Figure 2:
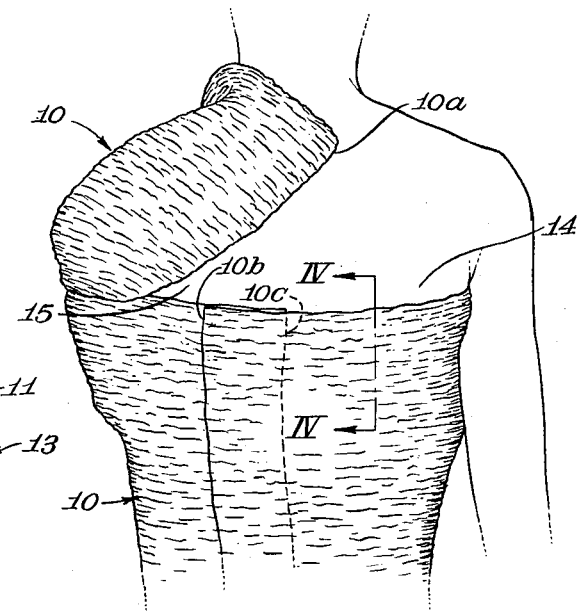
Figure 2 is a rear elevational view of the plaster of the present invention illustrating the plaster as applied to the neck, back and shoulder of a patient.

As illustrated in Figure 2, the plaster may be similarly applied to the neck, shoulder and back of the patient. However, it should be noted that the plasters 10 as applied to the shoulder and the back of the neck and to the back are not applied in strip form as in Figure 1 but are rather applied as single large sheets of superimposed layers of thermoplastic material. As seen in Figure 2, the material may be applied to the shoulder and neck with a freely extending edge 10a. The natural affinity of the thermoplastic material for the skin will cause the free edge 10a to adhere to the skin and to remain in place unless forcibly pulled from the skin.

The plaster as applied to the back of the patient is applied as a single large sheet which is simply wrapped around the area to be treated. The ends 10b and 10c of the sheet are overlapped and the natural affinity between the thermoplastic sheets will serve to secure the ends of the plaster. When the plaster is employed as illustrated in Figure 2 with a freely extending edge 10a, it is preferred that an article of clothing, such as an undershirt, be applied directly over the plaster to aid in holding the same in position and to prevent accidental displacement during any possible movement of the member undergoing treatment.

As shown in Figure 2, the bandage 10 as applied to the shoulder and neck muscles is effective in treating various disorders such as cervico brachial neuralgia, and as applied to the back for the treatment of lumbago or other back pains.

Figure 3:
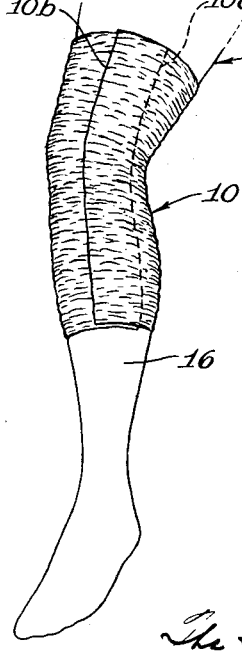
Figure 3 is a fragmentary elevational view of a plaster of the present invention applied to the limb of a patient.

In Figure 3, the plaster of the present invention is illustrated as applied to the limb 16. As shown, the plaster may be applied to the limb and to the knee joint as a single large sheet of a plurality of layers of thermoplastic film material for the treatment of arthritis, the ends 10b and 10c of the plaster being overlapped to maintain the plaster in position on the limb.

Figure 4:
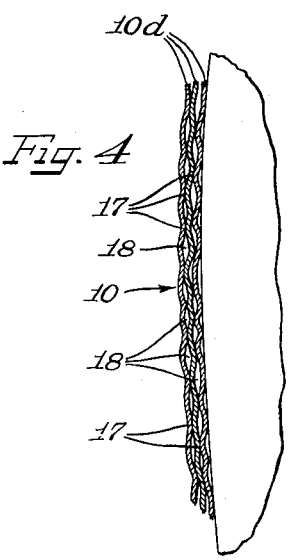
Figure 4 is a cross-sectional view, with parts shown in elevation, of a plaster of the present invention as taken along the lines IV—IV of Figure 2.

As illustrated in Figure 4, the plaster 10 is composed of a plurality of superimposed thermoplastic sheets 10d. In Figure 4, only three such superimposed sheets have been illustrated, but it should be understood that any number of such sheets may be employed. I prefer to employ at least six layers of the material and have found that plasters which comprise from 10 to 15 layers of thermoplastic sheet material are especially desirable and effective in use.

It should be noted in Figure 4 that each of the sheets 10d has been crumpled so as to present a non-uniform, non-planar cockled surface. The stock of superimposed crumpled sheets contact each other at a plurality of points such as point 17 in Figure 4. It may be seen that this contact between the air-impermeable sheets results in the formation of a plurality of relatively small air pockets 18 formed between adjacent sheets. The natural affinity between the sheets will cause the sheets to remain in contact at various points distributed along the length of the sheets. The air cavities 18 thus produced will function as dead air spaces to increase the insulating effect of the plaster. Further, the crumpled condition of the plaster allows for the expansion and contraction of the material so that the plaster may be applied directly to a joint as illustrated in Figure 3 and may be held in position thereagainst while not restricting any flexing movement of the joint. The crumpled condition of the plaster thus makes possible its use on members which must be flexed in order that the presence of the plaster may not interfere with the ordinary functions of the body. However, it should be understood that it is not necessary to crumple the sheets to present cockled surfaces. I have found that plasters composed of a plurality of superimposed sheets having plane surfaces may be equally effective in the treatment of various physical disorders.

The plasters of the present invention have proved to be effective in relieving muscular aches and pains in many varied applications. For example, the application of my plaster to a member which has been held in a cast relieves the pain which is usually present following the removal of the cast.

The plaster of the present invention may be furnished to the user as a single-thickness sheet of plastic material to be crumpled, if desired, before application to the member to be treated. The sheet material may then be formed into a plaster consisting of a plurality of superimposed sheets for application to that portion of the body to be treated. Alternatively, the plaster may be furnished as a plurality of superimposed plane or cockled plastic sheets for application directly to the member. In either case, the medicinal treatment is accomplished by the plaster itself and no additional medicinal agents, such as a liniment or ointment, is necessary.

It will, of course, be understood that various details of construction may be varied through a wide range without departing from the principles of this invention, and it is, therefore, not the purpose to limit the patent granted hereon otherwise than necessitated by the scope of the appended claims.

I claim as my invention:

1. A therapeutic plaster comprising a plurality of superimposed layers of cockled, flexible, air-impermeable plastic sheet material having continuous surfaces of a synthetic plastic, said layers being bound together by the natural affinity between the plastic surfaces thereof to form a unitary plaster having dead air spaces formed between said layers due to the cockled contacting sheet surfaces.

2. A therapeutic plaster comprising a plurality of superimposed layers of flexible air-impermeable plastic foil, said layers having a cockled, non-uniform surface, said layers being bound together solely by the natural affinity between the plastic surfaces of said layers to form a unitary plaster having dead air spaces formed between said layers due to the cockled contacting foil surfaces.

3. A therapeutic plaster consisting solely of a plurality of superimposed, flexible layers of cockled, air-impermeable non-tacky plastic film, said layers being bonded together into a unitary plaster solely by the natural affinity between the plastic film surfaces, and said plaster having an affinity for the human skin to maintain the same in position on the skin when placed in contact therewith.

4. The method of making a flexible, air-impermeable plaster, which comprises crumpling a flexible film of synthetic plastic materials, forming said crumpled film into a plurality of superimposed layers bound together solely by the natural affinity between the plastic film surfaces, and applying said layers to a member to be treated.

MITCHELL S. CORBETT.

REFERENCES CITED

The following references are of record in the file of this patent:

UNITED STATES PATENTS

| Number | Name | Date |
| --- | --- | --- |
| 1,755,744 | Munktell | Apr. 22, 1930 |
| 2,164,360 | Strauch | July 4, 1939 |
| 2,279,366 | Childs | Apr. 14, 1942 |
| 2,282,274 | Weiswasser | May 5, 1942 |
| 2,373,802 | Anderson | Apr. 17, 1945 |
| 2,385,879 | Patton | Oct. 2, 1945 |